United States Patent [19]

Popenoe

[11] 4,114,428
[45] Sep. 19, 1978

[54] RADIO-FREQUENCY TUNED-CIRCUIT MICRODISPLACEMENT TRANSDUCER

[76] Inventor: Charles H. Popenoe, 6307 Wiscasset Rd., Bethesda, Md. 20016

[21] Appl. No.: 726,140

[22] Filed: Sep. 24, 1976

[51] Int. Cl.² ............................................. G01L 5/00
[52] U.S. Cl. ................................... 73/88 F; 331/65; 336/200
[58] Field of Search ............ 73/88 F, 398 C; 331/65; 324/57 Q, 59, 61 QS; 336/105, 200

[56] References Cited

U.S. PATENT DOCUMENTS

| | | | |
|---|---|---|---|
| 1,647,474 | 11/1927 | Seymour | 336/200 X |
| 1,837,678 | 12/1931 | Ryder | 336/200 |
| 2,911,605 | 11/1959 | Wales, Jr. | 336/200 |
| 3,886,473 | 5/1975 | Heyck | 73/398 C X |
| 3,906,340 | 9/1975 | Wingfield et al. | 331/65 X |
| 3,943,915 | 3/1976 | Severson | 128/2 P |
| 4,016,764 | 4/1977 | Rice | 73/398 C |
| 4,026,276 | 5/1977 | Chubbuck | 128/2 P |

*Primary Examiner*—Jerry W. Myracle
*Attorney, Agent, or Firm*—Bacon & Thomas

[57] ABSTRACT

An inductance-capacitance loop defines a resonant circuit and is arranged in a member subject to stress. Strains resulting from the stress vary the inductance or capacitance of the circuit, and its resonant frequency. A dip meter is used to detect the resonant frequency and thus provides a reading indicative of the stress in the member.

8 Claims, 14 Drawing Figures

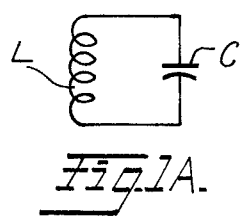
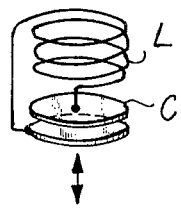
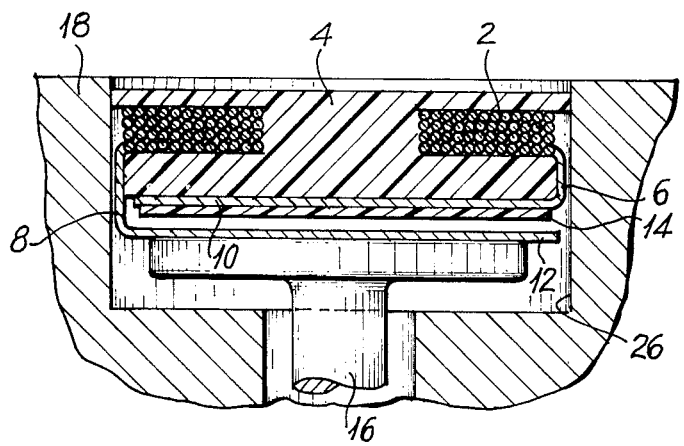
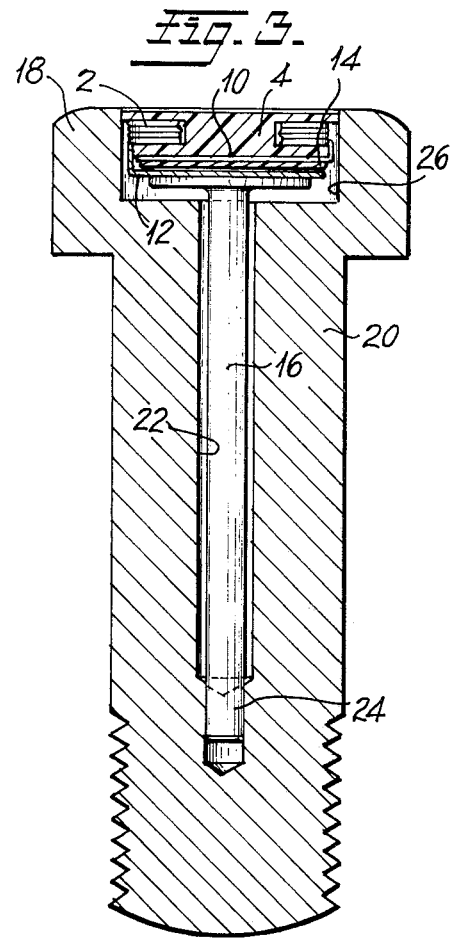
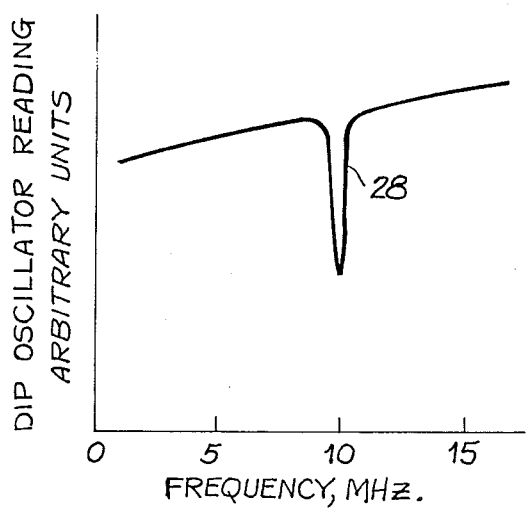
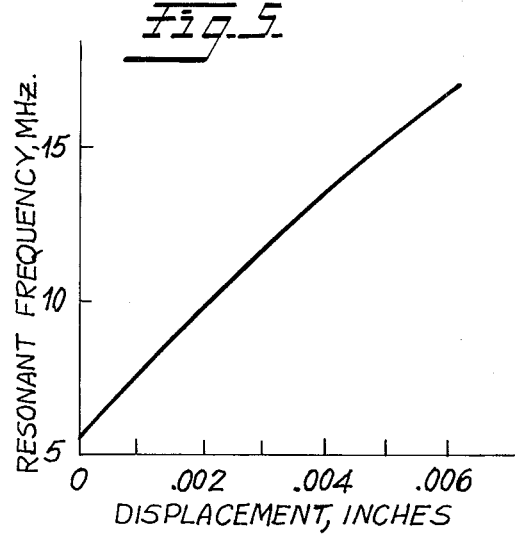

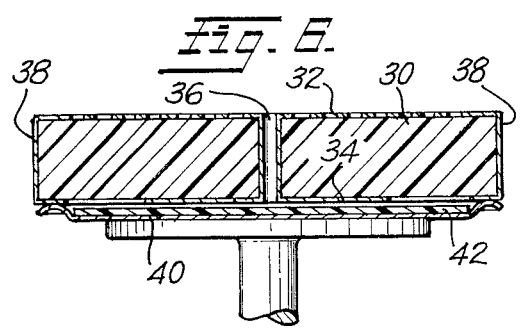
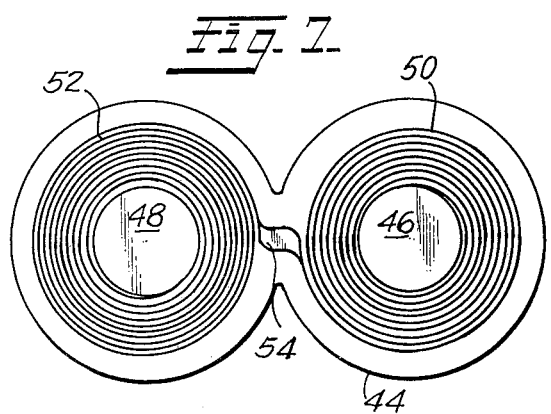
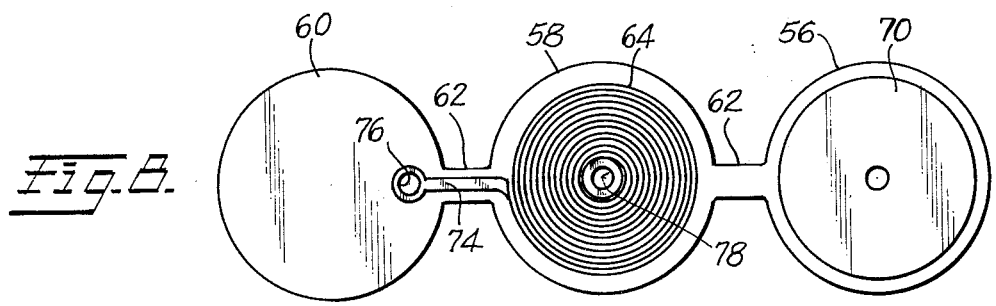
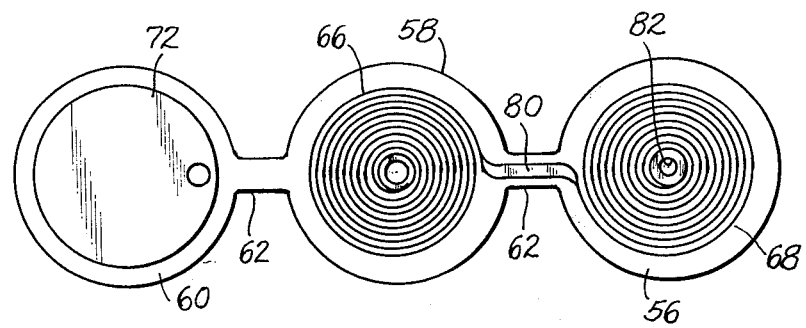
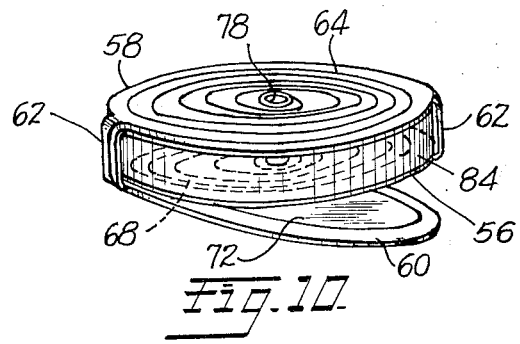

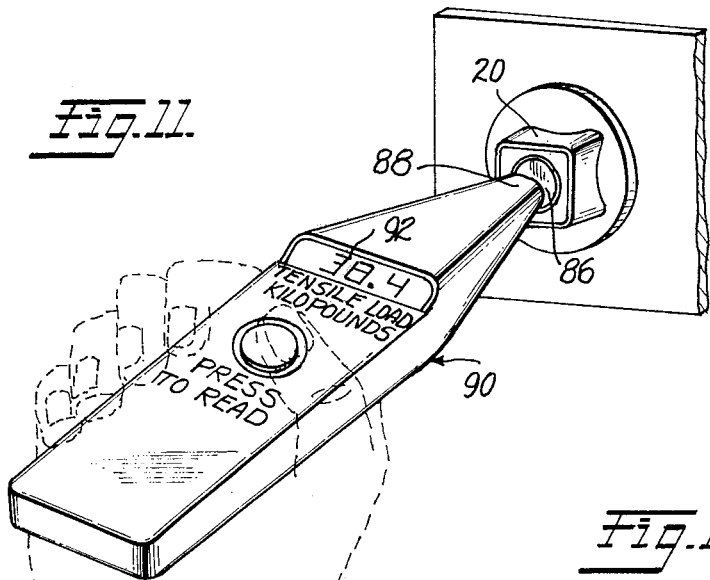
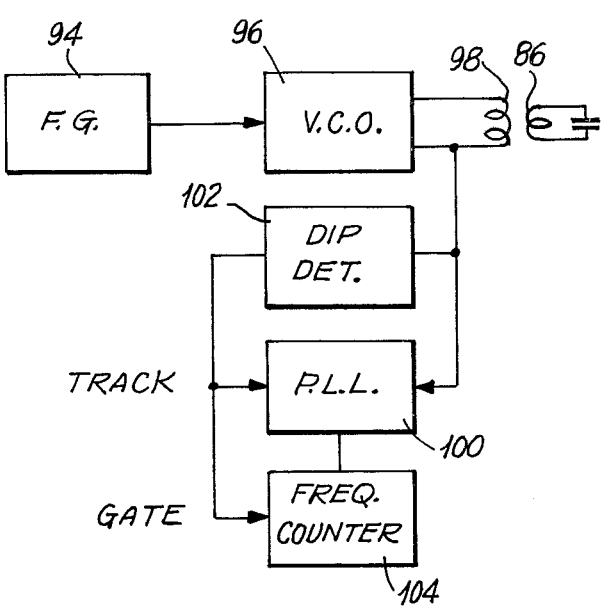
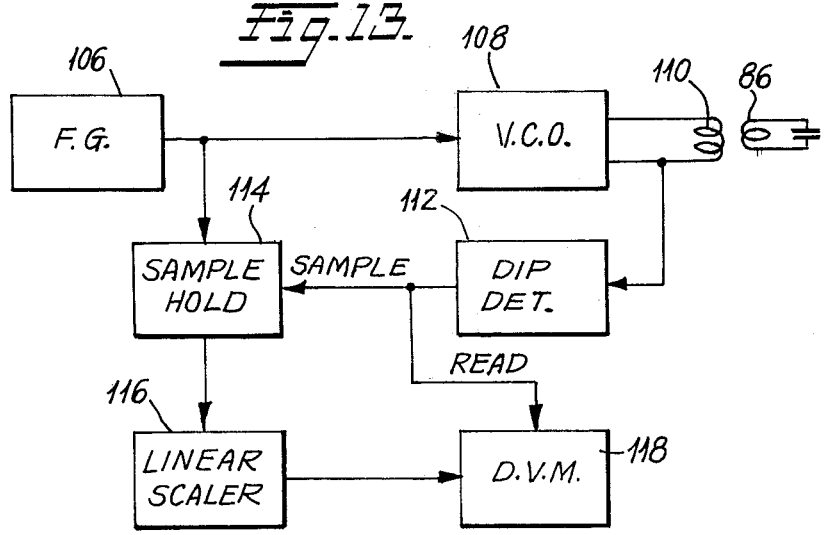

RADIO-FREQUENCY TUNED-CIRCUIT MICRODISPLACEMENT TRANSDUCER

BACKGROUND OF THE INVENTION

This invention is in the field of microdisplacement transducers, by which small displacements on the order of 0.001 inch may be measured.

Several types of microdisplacement indicators have been previously invented and patented by myself and others which indicate small displacements by means of a color or intensity change of a visual indicator area. Such indicators have been commonly employed in tensile fasteners to relate changes in elongation or deformation of the fastener to external loading conditions, such that at a prescribed load or tensile stress in the fastener, the indicator will display a prominent color or brightness condition. A known shortcoming of such visual indicators is due to the subjective nature of individual color vision, in that the accuracy of the device relies on the judgement of the operator as to whether or not the proper color change has taken place. Photometric instrumentation to measure the reflectance of the indicator element can eliminate the subjective aspect of the measurement, but is in turn subject to variations due to drift, reflections or dirt present on the indicator window.

SUMMARY OF THE INVENTION

It is a major object of the present invention to provide an accurate microdisplacement transducer which may be applied to similar applications as the previous devices, but will not be subject to individual operator interpretation.

A further object is to provide a microdisplacement transducer which is adapted to mass production in high volume at very low unit cost, such that the transducers may be widely employed in low-cost items, such as mine-roof bolts, without unduly increasing the costs of such items.

Another object of the invention is to provide a microdisplacement transducer adapted to being inductively-coupled to an electronic readout device selectively positioned in the proximity of the transducer, thus enabling measurement of the displacement condition of the transducer without the need for actual contact or electrical connections.

A still further object is to provide a microdisplacement transducer having an essentially digital output, such as frequency which is a funtion of microdisplacement, so that the measurement of such displacements will not be a function of amplitude or instrument drift but will consist of an easily determined quantity such as a frequency count.

An important advantage of the present invention lies in the ready adaptability to automated assembly and calibration of the transducers into end items such as tension-indicating fasteners.

These and other objects and advantages are obtained by the present invention in which the transducer is in the form of a self-contained tuned radio-frequency circuit, one element of which is made variable responsive to the displacement to be measured. The natural resonant frequency of the transducer tuned circuit thus will change proportionately to a displacement change acting on the variable element. The transducer resonant circuit may be excited into oscillation at its natural resonant frequency by means of an external test oscillator having a probe coil which is brought into the proximity of the transducer inductive element. When the external oscillator probe coil is brought near the inductive element of the transducer, the two circuits are effectively coupled together through mutual inductive coupling. As the frequency of the test oscillator is swept, oscillations induced in the transducer circuit will be of very low amplitude until the test oscillator reaches the resonant frequency of the transducer tuned circuit, at which point they will "peak" or increase sharply in amplitude. A high circulating current is thus developed in the transducer circuit, which is reflected back into the test oscillator as a high impedance, tending to degenerate the level of oscillation. By noting the degeneration or "dip," the resonant frequency of the transducer and therefore the displacement of the variable element may be determined. Test oscillators are available commerically under the names "dip meter" or "dip oscillator" which may be used to determine the resonant frequency of the subject transducers according to the above description. However, it has been found that better performance and coupling can be obtained with instruments designed specifically for this application.

It may be noted that the determination of the displacement applied to the transducer is completely independent of the amplitude of the response, and is dependent only on the frequency of resonant oscillation, which is inherently a digital measurement. Digital measurements may generally be made with more accuracy than is possible with an analog quantity, since instrument drift and gain instability will not affect a digital measurement. The accuracy of a frequency count is dependent solely on the stability of the timebase. With a crystal-controlled timebase, stabilities of 1 PPM are commonplace. The accuracy with which the resonant frequency of the subject transducers may be determined is thus limited only by the ability to resolve the "peak" or "dip" of the response. This is a function of the sharpness of the response peak of the transducer resonant circuit, which is determined by the circuit "Q" or quality factor. Since circuit "Q" is simply the ratio of the circuit reactance to circuit resistance, the transducers should be designed to have the highest possible inductance or capacitance and the lowest possible resistance to ensure a high "Q."

BRIEF DESCRIPTION OF THE DRAWINGS

FIG. 1A is a schematic illustration of a resonant circuit;

FIG. 1B is a diagram showing the general structural relationship of the inductor and capacitor as employed;

FIG. 2 is a sectional view of typical installation of the invention;

FIG. 3 is a sectional view, similar to FIG. 2, wherein the invention is installed in a bolt;

FIG. 4 is a graph showing the response of the transducer as measured by a dip oscillator;

FIG. 5 is a graph showing the relationship between strain displacements and resonant frequency;

FIG. 6 is a sectional view through a typical embodiment of the invention;

FIG. 7 is a view illustrating one way of forming the circuit loop;

FIG. 8 is a view of one side of a further form, in an intermediate stage;

FIG. 9 is a view of the other side of the structure of FIG. 8;

FIG. 10 is a perspective view showing how the structure of FIGS. 8 and 9 is folded to form a resonant circuit;

FIG. 11 is a view illustrating how the invention is used; and

FIGS. 12 and 13 are block diagrams showing suitable forms of dip oscillators.

DESCRIPTION OF THE PREFERRED EMBODIMENTS

The transducer consists of a resonant circuit comprising an inductance L and a capacitance C connected in series as shown schematically in FIG. 1A, and in actual physical relationship in FIG. 1B. Such transducers have been constructed as shown in FIG. 2, in which an inductive coil consisting of some 60 turns of wire 2 is wound on a thin plastic bobbin 4 about ⅜ inch diameter and ⅛ inch thickness. The terminations 6 and 8 of the coil are connected to two disks 10 and 12 of thin copper foil separated by a dielectric insulating film 14; the combination of the disks and film serving as the capacitive element. The upper foil disk 10 and dielectric 14 are bonded to the lower surface of the bobbin 4, and the lower foil disk 12 is free to move closer to or farther from the upper disk 10 responsive to movement of a headed actuating pin or element 16 relative to a supporting body 18. Thus, displacement of the pinhead causes the capacitance to vary accordingly, changing the resonant frequency of the LC circuit.

FIG. 3 shows a transducer shown in FIG. 2 applied to a tension-indicating fastener in the form of bolt 20, wherein the movable capacitor plate is actuated by pin 16 within the shank of the bolt. This is a typical application of the present invention, in which the tuned-circuit transducer may be employed to enable electronic readout of the actual tension in the shank of the bolt or other fastener, without contact or electrical connections. The bolt has an axial hole 22 in which pin 16 is loosely fitted but fastened to the bolt at the bottom 24 of the hole while free to move relative to the bolt at its upper end, which has a disk-like head, substantially transverse to the pin axis. A microdisplacement transducer as in FIG. 2 is mounted in a shallow recess 26 in the head of the bolt, such that the head of the pin 16 bears against or is fastened adhesively to the undersurface of the movable capacitor plate 12. When a stress load is applied to the bolt as by tightening the bolt head against a rigid structure, the shank of the bolt will elongate according to Hooke's Law, and the head of the reference pin 16 will be drawn relatively downward from the transducer and bolt head, increasing the gap between the two capacitor plates and thus decreasing the capacitance of the tuned circuit in proportion to the tensile load on the bolt. This will cause an increase in the transducer resonant frequency, which may be detected by an external dip meter or dip oscillator whose probe coil is brought near enough to the transducer coil to allow inductive coupling between the two coils. In this manner the tension in the fastener may be conveniently determined at the time of installation and at any subsequent time.

FIG. 4 shows a plot of the response of such a microdisplacement transducer as measured by a dip oscillator. As the frequency of the dip oscillator is swept, the response is relatively flat until the resonant frequency of the transducer is reached, at which point there will be a sharp dip, shown at 28 in the FIG. as occurring at about 10 MHz. After the dip has been located, the dip oscillator frequency at the minimum point may be accurately determined with a frequency counter. If the transducer resonant frequency is so determined at a number of different displacements applied to the transducer by pin 16 and the results plotted, a nearly linear relationship between resonant frequency and applied displacement will result as shown in FIG. 5. The actual relationship can be shown to follow a parabolic law, in which the resonant frequency of the transducer is approximately proportional to the square root of the applied displacement.

FIG. 6 shows another form of the transducer, etched upon a two-sided circuit board 30 of insulating material. A flat coil 32 is etched into the top side of the board by known "printed circuit" methods and a capacitor plate 34 is similarly etched into the underside of board 30, with the connection between the two made through a plated-through hole 36 in the center of board 30. The outer terminal 38 of the coil is plated over the board edge to make contact with a movable foil plate 40, fastened to the periphery of the underside of the board in contact with outer terminal 38 and movable upon actuation by an external pin or element as described with reference to FIGS. 2 and 3. A dielectric film 42 separates the two capacitor plates 34 and 40.

Alternative forms of the microdisplacement transducer may be made by etched circuit techniques on a flexible plastic film base. Such circuits may be processed by high volume machinery automatically and continuously at a very low unit cost. One such circuit configuration is shown in FIG. 7. This transducer is etched onto a single side of a butterfly-shaped flexible base film 44, using about 1 mil copper foil on a 1 mil plastic base. The capacitor plates 46 and 48 are situated in the centers of the two joined disks of film 44, with the inductor in the form of flat coils 50 and 52 surrounding the capacitor plates and connected by a foil neck 54. The foil side of the circuit is covered with a very thin insulating dielectric film. The two disks are folded over onto each other to make a circular transducer, which may be applied to any application, such as that shown in FIG. 3. In the application of FIG. 3, the undersurface of the flexible circuit transducer of FIG. 7 is attached adhesively to a non-metallic disk element (not shown) fastened at its periphery in the recess in the fastener head. Operation is identical to that described previously.

Another flexible circuit configuration is shown in FIGS. 8, 9 and 10, which has the advantage of having increased inductance and capacitance over the configuration shown in FIG. 7, while having the same outer diameter. The resonant frequency will thus be lowered and the circuit "Q" increased, increasing accuracy and reducing potential instrumentation problem areas. In FIGS. 8 and 9, it may be seen that the circuit is two-sided, with connections between sides being made through plated-through holes. Three disks 56, 58 and 60 of flexible insulating film material are joined by integral necks 62. Inductor coils 64 and 66 are etched on opposite sides of disk 58 and an additional coil 68 is etched on one side of 56. The other side of disk 56 has capacitor plate 70 etched thereon while the side of disk 60 corresponding to coils 66 and 68 has capacitor plate 72 etched thereon. Foil strip connects one end of coil 64 to plate 72 through plated hole 76. The center of coil 64 is connected to the center of coil 66 through plated hole 78. coils 66 and 68 are connected by foil strip 80, and the center of coil 68 is connected to plate 70 through plated hole 82. The flexible circuit device thus described is folded on necks 62 around a nonmetallic disk element 84 as shown in FIG. 10, such that the three coil elements are situated above the two capacitor plates. Movement of the lower capacitor plate 72 relative to upper plate 70 will change the capacitance and the resonant frequency of the transducer.

The transducer of FIG. 10 may obviously be mounted in a bolt or the like in the manner shown in FIG. 3.

An important characteristic of transducers having etched foil inductors on the exposed top surface, such as the transducers of FIGS. 6-7, and 8-10, is that the resonant frequency may be "trimmed" by shorting together a number of the exposed inductor turns. This capability enables a fine adjustment of resonant frequency after installation, to compensate for normally expected manufacturing tolerances in products incorporating the transducers. For instance, it is well known that large variations in mechanical properties may be expected to occur between different bolts having purportedly identical dimensions and materials. This causes a variation in the deflection or elongation characteristics between identical bolts stressed with identical tensile loads, and therefore a resultant variation in the resonant frequency of transducers applied to tension-indicating bolts. This variation may be "calibrated out" during the manufacturing process by applying an accurate tensile load to each bolt after installation of the transducer, and measuring the resonant frequency at that known load. If the measured frequency differs from the desired design condition, coil turns are successively shorted together until the desired frequency has been reached. In this manner, all tension-indicating bolts may be made to have identical frequencies at the design load condition.

As previously mentioned, the resonant frequency of the tuned-circuit transducers of this invention may be determined through the use of a commercially available "dip meter." However, higher accuracy and more convenient operation will result from use of a more specialized measurement system, such as will be described. Although the described systems are in reality quite sophisticated, because of recent integrated circuit technology they are adapted to be incorporated into battery-powered hand-held instruments, comparable in size to a pocket sized calculator. Such a measurement system is shown in FIG. 11, being used to determine the tensile load on a mine roof bolt 20 which incorporates a microdisplacement transducer 86 applied, for instance, as shown in FIG. 3. The measurement of the actual tension will be shown in the following teachings to be accurately and conveniently made within a few seconds, by simply bringing the probe end 88 of the instrument 90 near to, or touching the transducer 80 embedded within the head of the bolt 20. As the probe is withdrawn an accurate measurement of the displacement state of the transducer, or in the case of this example, the tensile load on the mine roof bolt will remain displayed on the digital readout 92.

The basic principles of a measurement system which determines the resonant frequency of a tuned-circuit transducer completely automatically will be explained with reference to the block diagram of FIG. 12. The electronic system shown in FIG. 12 will display the resonant frequency of any resonant tuned circuit, such as the transducers of this invention, which may be effectively inductively coupled to the probe coil of the system.

In FIG. 12 a free-running function generator 94 outputs a ramp or triangular waveform at a relatively low frequency, say between 1 and 1000 Hz. The voltage output of 94 is directed into a voltage-controlled oscillator 96, whose output is a radiofrequency sinusoidal waveform at a frequency which is proportional to the input voltage. Thus, the output of 96 is a swept radiofrequency signal sweeping from perhaps 5 to 15 MHz, so as to completely bracket the frequencies at which the tuned-circuit transducers would be capable of resonating. The output of 96 drives a probe coil 98, which may be brought into proximity to tuned-circuit transducer 86. A portion of the output of 96 is directed into a tracking oscillator 100, which may be of the form of a phase-locked loop circuit, the output of which normally tracks and remains synchronized with the input frequency from VCO 96. A signal proportional to the instantaneous power driving probe coil 98 is directed into dip detector 102. This circuit generates an output pulse at the minimum point of the "dip" response as shown in FIG. 4, as the VCO frequency is swept. There are a number of well-known methods for detecting this "dip," such as a differentiating circuit followed by a zero-crossing detector. The pulse output of the dip detector 102 is present only when a dip has been detected, and then only at the minimum point of the dip where the derivative is zero. This output is directed to the tracking oscillator 100 to "freeze" its frequency of oscillation at the input frequency at the instant that the dip was detected. The same signal is used to gate a frequency counter 104, which reads the output frequency of 100 and displays the resultant count.

The system of FIG. 12 operates in the following manner. The probe coil 98 is initially distant from a resonant circuit 86 and no dip is detected by 102 as VCO 96 is swept through its range. The digital display of counter 104 is blanked as the system is initially activated, and remains blanked until a dip is detected. As the probe coil is brought near enought to transducer 86 to become inductively coupled, that condition is reflected back into the probe circuit and a dip is detected during each frequency sweep, which causes counter 104 display to update once per sweep. This count will vary somewhat with distance between probe coil 98 and transducer 86, due to the loading effect of the probe coil on the resonant circuit of transducer 86. As the probe is removed from the vicinity of transducer 86 the coupling will decrease with distance until a dip can no longer be detected by 102, and the last detachable frequency count will remain in the display of counter 104. It is well-known that the most accurate measurement of the resonant frequency of a tuned circuit is produced when the coupling between the probe circuit and the test circuit is as "loose" as possible. This condition will normally be achieved by the system of FIG. 12 when used in the described manner.

A similar measurement system is shown in block diagram form in FIG. 13, wherein the output of the measurement may be displayed in engineering units more convenient to the application of the transducer, as in FIG. 11, rather than as a resonant frequency which would have to be converted to the desired units. For instance, if the tuned-circuit microtransducers were used in tension-responsive bolts, the tensile load on the bolt may be displayed directly in kilopounds or kilonewtons.

A function generator 106 corresponds to 94 in the previous figure, oscillates at a relatively low frequency with a ramp or triangular waveform and causes voltage-controlled oscillator 108 to sweep its ouput between, say, 5 and 15 MHz. The output of 108 is directed to probe coil 110 which may be inductively coupled to tuned-circuit transducer 86, thus far exactly as in the system of FIG. 12. A "dip" in the probe circuit power due to a resonance condition between transducer 86 and probe circuit 108 and 110 is detected as before by dip detector 112. A sample-hold circuit 114 has an input leading from the function generator voltage output, and an output which corresponds to the input voltage at the instant that a pulse is applied to the "sample" input. This output voltage is then held at the constant value until another pulse is applied to the "sample" input. The output of 114 is directed into a linearizing and scaling circuit 116 which removes the beforementioned square-root dependence of the dip frequency and scales the output such that the voltage output of 116 corresponds to the tensile load on the bolt in the proper engineering units. The output of linearizer-scaler 116 may be directed into a voltmeter for an analog display, or preferably into digital voltmeter 118 which produces a direct digital display of the bolt tensile load measurement.

While the foregoing descriptions relate to forms wherein the resonant frequency of the transducer is changed by moving capacitor plates relative to each other it is to be understood that the same results could be obtained by moving portions of a coil toward or from each other to vary their coupling. It is to be noted that in the form shown in FIG. 7 both plates 46 and 48 and coils 50 and 52 are movable toward and from each other.

While a limited number of specific embodiments of the invention have been shown and described, the same are merely illustrative of the principles of the invention and other forms may be resorted to within the scope of the appended claims.

I claim:

1. In a strain-stress detecting system comprising:
    an elongated integral fastener member subject to elastic deformation when stressed wherein one portion thereof moves relative to another portion;
    a resonant circuit assembly carried by said member, said assembly comprising a body of electrical insulating material on said member;
    an electrical coil on one surface of said body;
    a first capacitor plate on an opposite surface of said body and first means electrically connecting said capacitor plate to one end of said coil;
    a second capacitor plate adjacent and movable toward and from said first plate and second means electrically connecting said second plate to the other end of said coil whereby said coil and plates define a resonant circuit; and
    one of said plates being fixed relative to one of said portions of said member and the other plate being fixed relative to the other portion whereby elastic deformation of said member will vary the resonant frequency of said circuit.

2. A system as defined in claim 1 wherein a film of dielectric material is positioned between said plates.

3. A system as defined in claim 1 wherein said body is a generally cylindrical bobbin having a circumferential groove, one side of said groove and one end of said bobbin comprising said one and opposite surfaces and said coil comprising a coil of wire in said groove lying against said one surface.

4. A system as defined in claim 1 wherein said body is in the form of a flat disk, said coil being a spiral coil of metal foil on one surface of said disk, said first plate being a layer of metal foil on the other side of said disk and said first means comprising conductive foil extending from the center of said coil through a hole in said disk to said first plate.

5. A system as defined in claim 1 wherein said body is a sheet of said electrical insulating material, said first and second plate being layers of foil on different surface portions of said body, said coil comprising separate coil portions on different parts of said sheet and each being a spiral of foil on the surface of said sheet, said sheet being folded upon itself to bring said coil portions into concentric juxtaposition and to bring said plates into opposed relation.

6. A system as defined in claim 1 wherein said body is a sheet of said electrical insulating material, said plates comprise spaced metal foils on different portions of one face of said sheet and said coil comprises a spiral foil coil portion surrounding each of said metal foil plates on said one face of said sheet, said sheet being folded upon itself to bring said different portions of said one face, said plates and said coil portions into adjacent opposition.

7. A system as defined in claim 1 including, a longitudinal bore in said member, a recess in one end of said member in one of said portions, said bore extending from said recess into the other portion, said assembly being mounted in said recess and motion transmitting means in said bore to transmit motion from said other portion to said other plate.

8. A transducer comprising a foldable sheet of electrical insulating material having at least one flat spiral conductive coil on a surface thereof, a pair of conductive capacitor plates covering different surface areas of said sheet, said plates being respectively electrically connected to opposite ends of said coil, and said sheet being folded to place said plates in opposition to each other with one of said plates being movable toward and from the other plate by flexure of said sheet material to vary the frequency of the tuned circuit defined by said plates and coil.

* * * * *